(12) United States Patent
Nordlund

(10) Patent No.: US 8,884,963 B2
(45) Date of Patent: Nov. 11, 2014

(54) LOW RESOLUTION BUFFER BASED PIXEL CULLING

(75) Inventor: Petri Nordlund, Vanhalinna (FI)

(73) Assignee: QUALCOMM Incorporated, San Diego, CA (US)

( * ) Notice: Subject to any disclaimer, the term of this patent is extended or adjusted under 35 U.S.C. 154(b) by 218 days.

(21) Appl. No.: 13/100,470

(22) Filed: May 4, 2011

(65) Prior Publication Data

US 2012/0280998 A1 Nov. 8, 2012

(51) Int. Cl.
*G06T 11/00* (2006.01)
*G06T 15/00* (2011.01)
*G06T 15/40* (2011.01)

(52) U.S. Cl.
CPC .............. *G06T 15/005* (2013.01); *G06T 15/405* (2013.01)
USPC .......................................... 345/428; 345/520

(58) Field of Classification Search
CPC ........... G06T 1/20; G06T 1/60; G06T 15/005; G06T 15/00; G06T 15/04; G06T 2210/36; G06F 3/14; G09G 5/363; G09G 5/391
See application file for complete search history.

(56) References Cited

U.S. PATENT DOCUMENTS

| | | | | |
|---|---|---|---|---|
| 6,690,373 | B2 * | 2/2004 | Lim | 345/426 |
| 6,806,875 | B2 * | 10/2004 | Nakatsuka et al. | 345/426 |
| 6,924,801 | B1 * | 8/2005 | Dorbie | 345/422 |
| 7,061,507 | B1 * | 6/2006 | Tuomi et al. | 345/611 |
| 7,812,837 | B2 | 10/2010 | Naoi | |
| 2002/0093516 | A1 * | 7/2002 | Brunner et al. | 345/629 |
| 2003/0095134 | A1 * | 5/2003 | Tuomi et al. | 345/611 |
| 2004/0212614 | A1 * | 10/2004 | Aila et al. | 345/421 |
| 2005/0248569 | A1 * | 11/2005 | Fong et al. | 345/421 |
| 2006/0055702 | A1 * | 3/2006 | Hall | 345/545 |
| 2006/0187220 | A1 * | 8/2006 | Yamamoto et al. | 345/422 |
| 2007/0124474 | A1 * | 5/2007 | Margulis | 709/226 |
| 2008/0042923 | A1 * | 2/2008 | De Laet | 345/1.3 |
| 2008/0273032 | A1 * | 11/2008 | Brennan | 345/421 |
| 2008/0273033 | A1 * | 11/2008 | Brennan | 345/422 |
| 2009/0073177 | A1 * | 3/2009 | Jiao et al. | 345/501 |
| 2009/0091569 | A1 * | 4/2009 | Nordlund et al. | 345/422 |
| 2009/0225089 | A1 * | 9/2009 | Schreyer et al. | 345/506 |
| 2010/0141666 | A1 * | 6/2010 | Christopher et al. | 345/520 |
| 2010/0231600 | A1 * | 9/2010 | Kaufman et al. | 345/545 |
| 2010/0265254 | A1 * | 10/2010 | Liland et al. | 345/441 |
| 2010/0265259 | A1 * | 10/2010 | Faye-Lund et al. | 345/506 |
| 2011/0074802 | A1 * | 3/2011 | Nickolls et al. | 345/564 |
| 2011/0148892 | A1 * | 6/2011 | Shreiner et al. | 345/545 |

(Continued)

OTHER PUBLICATIONS cpn2000: Clipping in Open GL, Using the stencil buffer for clipping, Version 10, Sep. 14, 1999, 7 pp.

(Continued)

*Primary Examiner* — Kee M Tung
*Assistant Examiner* — Michele Chin
(74) *Attorney, Agent, or Firm* — James R. Gambale, Jr.

(57) ABSTRACT

Aspects of this disclosure are directed to updating a low resolution buffer during a binning pass of an image surface by a graphics processing unit (GPU). For example, during the binning pass of the image surface, the GPU may divide the image surface into a plurality of blocks of surface pixels of the image surface. The GPU may then store a surface identifier of the image surface within storage locations of the low resolution buffer to correspond to each of the blocks of the surface pixels of the image surface.

30 Claims, 7 Drawing Sheets

(56) References Cited

U.S. PATENT DOCUMENTS

| | | | |
|---|---|---|---|
| 2011/0148901 A1* | 6/2011 | Adams et al. | 345/589 |
| 2011/0148919 A1* | 6/2011 | Heggelund et al. | 345/629 |
| 2011/0148923 A1* | 6/2011 | Sadowski et al. | 345/634 |
| 2011/0154307 A1* | 6/2011 | Upton | 717/146 |
| 2011/0157206 A1* | 6/2011 | Duluk et al. | 345/582 |
| 2011/0157207 A1* | 6/2011 | Hall et al. | 345/582 |
| 2011/0221743 A1* | 9/2011 | Keall et al. | 345/419 |
| 2011/0227920 A1* | 9/2011 | Adams et al. | 345/426 |
| 2011/0242113 A1* | 10/2011 | Keall et al. | 345/505 |
| 2011/0242125 A1* | 10/2011 | Hall et al. | 345/582 |
| 2011/0243469 A1* | 10/2011 | McAllister et al. | 382/239 |
| 2011/0261059 A1* | 10/2011 | Keall et al. | 345/442 |
| 2011/0298814 A1* | 12/2011 | Mathew et al. | 345/531 |
| 2012/0081580 A1* | 4/2012 | Cote et al. | 348/231.99 |
| 2012/0173755 A1* | 7/2012 | Margulis | 709/231 |
| 2012/0206447 A1* | 8/2012 | Hutchins | 345/419 |
| 2012/0206455 A1* | 8/2012 | Shreiner | 345/420 |

OTHER PUBLICATIONS

Aila T., et al., "Delay Streams for Graphics Hardware," ACM, pp. 792-800, 2003 ,XP040167408.

International Search Report and Written Opinion—PCT/US2012/036651—ISA/EPO—Sep. 5, 2012.

Yang et al., "CoarseZ Buffer Bandwidth Model in 3D Rendering Pipeline", First International Multi-Symposiums on Computer and Computational Sciences (IMSCCS '06), Hangzhou, Zhejiang, China Apr. 20-24, 2006, Piscataway, NJ, USA, Jun. 20, 2006, pp. 737-742, IEEE, XP031361951, ISBN: 978-0-7695-2581-5 .

Ribble M., "Next-Gen: Tile-Based GPUs", Game developers conference mobile'08, San Francisco, Feb. 18-22, 2008, pp. 36.

* cited by examiner

LOW RESOLUTION BUFFER BASED PIXEL CULLING

TECHNICAL FIELD

This disclosure relates to rendering pixels on a display.

BACKGROUND

A device that provides content for visual presentation generally includes a graphics processing unit (GPU). The GPU renders pixels that are representative of the content on a display. The GPU generates one or more pixel values for each pixel on the display. The GPU performs graphics processing on the pixel values for each pixel on the display to render each pixel for presentation.

SUMMARY

In general, this disclosure describes techniques for updating a low resolution buffer, referred to as a low resolution z-buffer or "LRZ" buffer, during a binning pass of a graphics processing unit (GPU). In the binning pass, also referred to as a tiling pass, the GPU may determine which image surfaces generated by a processor belong to which tiles on a display. During this binning pass, the GPU may update the low resolution buffer with surface identifiers associated with each of the image surfaces.

The low resolution buffer may include a plurality of storage locations, where each storage location is associated with a plurality of pixels on the display. During the binning pass, the GPU may store a surface identifier for an image surface within a storage location of the low resolution buffer if the image surface includes pixels whose coordinates are associated with the storage location of the low resolution buffer.

In one example, aspects of this disclosure are directed to a method comprising receiving, with a graphics processing unit (GPU), at least a first image surface and a second image surface, wherein the second image surface at least partially overlaps the first image surface. The method also includes performing, with the GPU, a binning pass on the first image surface. In accordance with the method, during the binning pass of the first image surface, dividing, with the GPU, the first image surface into a plurality of blocks of surface pixels of the first image surface. Also, during the binning pass of the first image surface, storing, with the GPU, a surface identifier value for the first image surface within a storage location of a plurality of storage locations within a low resolution buffer that corresponds to a block of the plurality of blocks of surface pixels of the first image surface, wherein each of the plurality of storage locations within the low resolution buffer also corresponds to a block of pixels on a display.

In another example, aspects of this disclosure are directed to an apparatus comprising a low resolution buffer that includes a plurality of storage locations. The apparatus also includes a graphics processing unit (GPU) configured to receive at least a first image surface and a second image surface, wherein the second image surface at least partially overlaps the first image surface, and perform a binning pass on the first image surface. In the apparatus, during the binning pass of the first image surface, the GPU is further configured to divide the first image surface into a plurality of blocks of surface pixels of the first image surface. During the binning pass of the first image surface, the GPU is also further configured to store a surface identifier value for the first image surface within a storage location of the plurality of storage locations within the low resolution buffer that corresponds to a block of the plurality of blocks of surface pixels of the first image surface, wherein each of the plurality of storage locations within the low resolution buffer also corresponds to a block of pixels on a display.

In another example, aspects of this disclosure are directed to a non-transitory computer-readable storage medium comprising instructions that cause a graphics processing unit (GPU) to receive at least a first image surface and a second image surface, wherein the second image surface at least partially overlaps the first image surface. The instructions also include instructions that cause the GPU to perform a binning pass on the first image surface. During the binning pass of the first image surface, the instructions cause the GPU to divide the first image surface into a plurality of blocks of surface pixels of the first image surface. Also, during the binning pass of the first image surface, the instructions cause the GPU to store a surface identifier value for the first image surface within a storage location of a plurality of storage locations within a low resolution buffer that corresponds to a block of the plurality of blocks of surface pixels of the first image surface, wherein each of the plurality of storage locations within the low resolution buffer also corresponds to a block of pixels on a display.

In another example, aspects of this disclosure are directed to an apparatus comprising a low resolution buffer that includes a plurality of storage locations. The apparatus also includes a graphics processing unit (GPU), wherein the GPU comprises means for receiving at least a first image surface and a second image surface, wherein the second image surface at least partially overlaps the first image surface. The GPU also comprises means for performing a binning pass on the first image surface. In the apparatus, during the binning pass of the first image surface, the GPU also comprises means for dividing the first image surface into a plurality of blocks of surface pixels of the first image surface. In the apparatus, during the binning pass of the first image surface, the GPU also includes means for storing a surface identifier value for the first image surface within a storage location of the plurality of storage locations within the low resolution buffer that corresponds to a block of the plurality of blocks of surface pixels of the first image surface, wherein each of the plurality of storage locations within the low resolution buffer also corresponds to a block of pixels on a display.

The details of one or more examples are set forth in the accompanying drawings and the description below. Other features, objects, and advantages will be apparent from the description and drawings, and from the claims.

DETAILED DESCRIPTION

Figure 1:
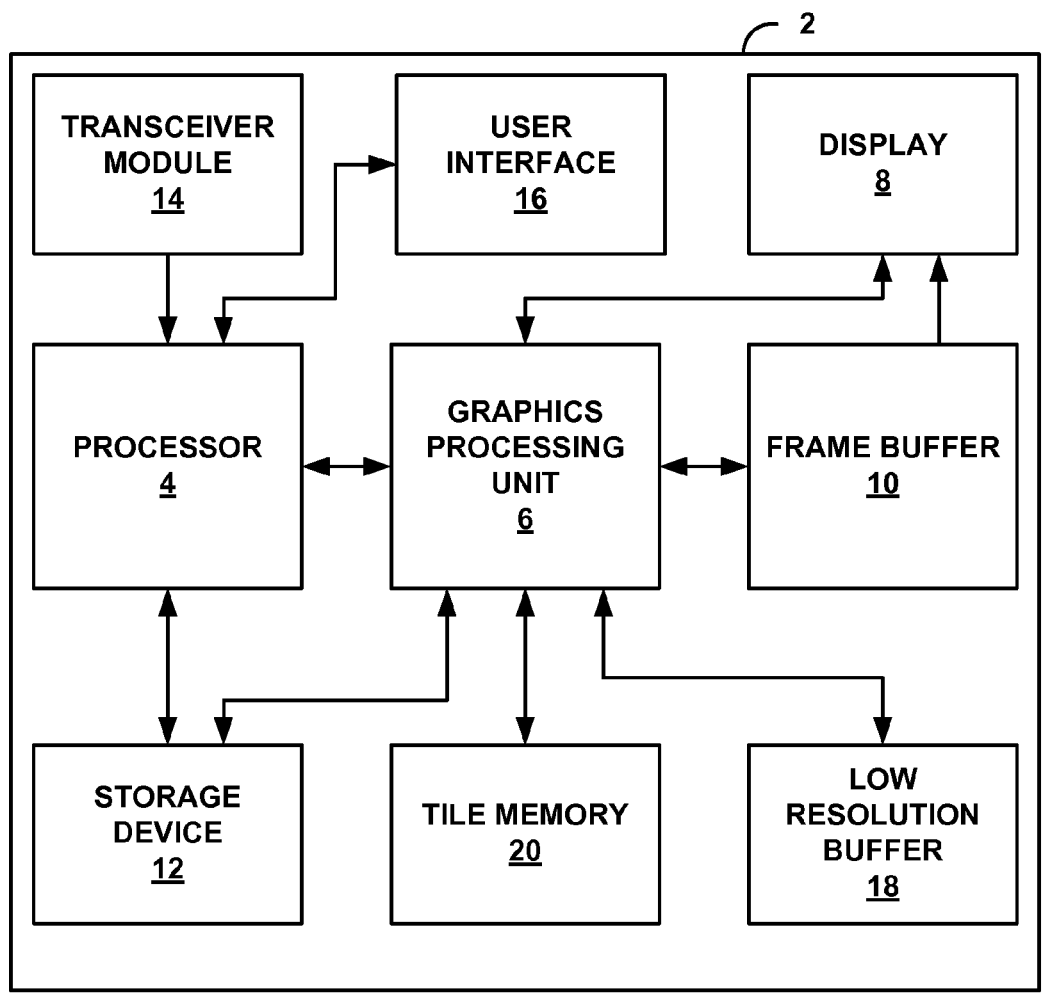
FIG. 1 is a block diagram illustrating a device that may be configured to implement aspects of this disclosure.

A display, on a device, presents viewable objects produced by applications executed by a processor within the device. The viewable objects generally take the form of a rectangle, although other forms are possible. The viewable objects may be considered as image surfaces containing surface pixels. When the device executes one or more applications that generate multiple image surfaces, one image surface may partially or fully overlap another surface.

In addition to executing the one or more applications to generate the image surfaces, the processor may also determine pixel values for the surface pixels within the image surfaces. For example, the processor may determine coordinates of the vertices of the image surfaces. As another example, the processor may determine the color values of the surface pixels within the image surfaces, e.g., red-green-blue (RGB) values or luma and chroma values for each surface pixel within the image surfaces, and opaqueness values of the pixels, e.g., alpha values. The processor may transmit the pixel values for each image surface to a graphics processing unit (GPU) for further processing. In some examples, the processor may transmit the pixel values, to the GPU, starting from the back-most image surface and continuing to the front-most image surface.

The GPU may receive the pixel values for each of the image surfaces, and in some examples, assign a surface identifier value to each of the image surfaces based on the order in which the GPU received the image surfaces. In an alternate example, the processor may assign the surface identifier value to each one of the surfaces and transmit the surface identifier value to the GPU along with the pixel values for that image surface.

The GPU may perform processing on the received pixels for rendering an image on the display. One example of the processing performed by the GPU is referred to as binning pass or tiling pass. For binning, the GPU divides the pixels on a display into a plurality of blocks of pixels referred to as tiles. For each image surface, in the binning pass, the GPU may determine to which tile an image surface belongs.

As described in more detail, during the binning pass for an image surface, the GPU may update a low resolution buffer, referred to as a low resolution z-buffer or "LRZ buffer." The low resolution buffer may be a two-dimensional buffer with a plurality of storage locations. Each storage location in the low resolution buffer may correspond to a block of pixels represented on the display. In some examples, the number of storage locations within the low resolution buffer may be less than the number of pixels to be represented on the display.

During the binning pass for an image surface, the GPU may determine whether that image surface includes surface pixels that correspond to a storage location within the low resolution buffer. For example, the GPU may divide the image surface into a plurality of blocks of surface pixels. The size of the blocks of surface pixels may be similar to the size of the blocks of pixels on the display that correspond to one storage location in the low resolution buffer.

For each block of surface pixels within an image surface, the GPU may store the surface identifier of the image surface within corresponding storage locations of the low resolution buffer. For example, during the binning pass of a first image surface, the GPU may store the surface identifier of the first image surface within storage locations of the low resolution buffer that correspond to each block of surface pixels within the first image surface. The GPU may perform similar functions during the binning pass of each of the image surfaces.

After updating the low resolution buffer with the surface identifier values, the GPU may render an image to a frame buffer based on the surface identifier values stored in the low resolution buffer. To render pixels, for each pixel on the display, the GPU may determine which pixels to render from which surface based on the surface identifier stored within the low resolution buffer. For example, the first storage location within the low resolution buffer may indicate which surface to render for pixels (0, 0) to (3, 3) on the display. The GPU may then render the pixels from the image surface identified by its surface identifier stored in the first location within the low resolution buffer.

FIG. 1 is a block diagram illustrating a device 2 that may be configured to implement aspects of this disclosure. Examples of device 2 include, but are not limited to, wireless devices, mobile telephones, personal digital assistants (PDAs), video gaming consoles that include video displays, mobile video conferencing units, laptop computers, desktop computers, television set-top boxes, tablet computing devices, e-book readers, and the like. Device 2 may include processor 4, graphics processing unit (GPU) 6, display 8, frame buffer 10, storage device 12, transceiver module 14, user interface 16, low resolution buffer 18, which may be referred to as a low resolution-z buffer or LRZ buffer, and tile memory 20. Device 2 may include additional modules or units not shown in FIG. 1 for purposes of clarity. For example, device 2 may include a speaker and a microphone, neither of which are shown in FIG. 1, to effectuate telephonic communications in examples where device 2 is a mobile wireless telephone. Furthermore, the various modules and units shown in device 2 may not be necessary in every example of device 2. For example, user interface 16 and display 8 may be external to device 2 in examples where device 2 is a desktop computer.

Processor 4 may execute one or more applications. Examples of the applications include web browsers, e-mail applications, spreadsheets, video games, or other applications that generate viewable objects for presentment. The one or more applications may be stored within storage device 12. In some instances, processor 4 may download the one or more applications via transceiver module 14. Processor 4 may execute the one or more applications based on a selection by a user via user interface 16. In some examples, processor 4 may execute the one or more applications without user interaction.

Examples of processor 4 include, but are not limited to, a digital signal processor (DSP), general purpose microprocessor, application specific integrated circuit (ASIC), field programmable logic array (FPGA), or other equivalent integrated or discrete logic circuitry. Storage device 12 may comprise one or more computer-readable storage media. Examples of storage device 12 include, but are not limited to, a random access memory (RAM), a read only memory (ROM), an electrically erasable programmable read-only memory (EEPROM), CD-ROM or other optical disk storage, magnetic disk storage, or other magnetic storage devices, flash memory, or any other medium that can be used to carry or store desired program code in the form of instructions or data structures and that can be accessed by a computer or a processor. In some aspects, storage device 12 may include instructions that cause host processor 4 and/or GPU 6 to perform the functions ascribed to host processor 4 and GPU 6 in this disclosure.

Storage device 12 may, in some examples, be considered as a non-transitory storage medium. The term "non-transitory" may indicate that the storage medium is not embodied in a carrier wave or a propagated signal. However, the term "non-transitory" should not be interpreted to mean that storage device 12 is non-movable. As one example, storage device 12 may be removed from device 2, and moved to another device. As another example, a storage device, substantially similar to storage device 12, may be inserted into device 2. In certain examples, a non-transitory storage medium may store data that can, over time, change (e.g., in RAM).

Examples of user interface 16 include, but are not limited to, a trackball, a mouse, a keyboard, and other types of input devices. User interface 16 may also be a touch screen and may be incorporated as a part of display 8. Transceiver module 14 may include circuitry to allow wireless or wired communication between device 2 and another device or a network. Transceiver module 14 may include modulators, demodulators, amplifiers and other such circuitry for wired or wireless communication.

Upon execution of the one or more applications, processor 4 may generate viewable objects in the form of image surfaces. The image surfaces may be rendered on display 8, as an image, for presentation. In some instances, some of the surface pixels of the image surfaces may not be rendered because these surface pixels may be occluded by other co-located surface pixels. The image surfaces may be circles, lines, rectangles, triangles, or other types of polygons. Processor 4 may also identify the location of where the image surfaces are located on display 8 based on pixel coordinates of display 8. The location may identify the extents of the image surfaces on display 8.

Display 8 may comprise a liquid crystal display (LCD), a cathode ray tube (CRT) display, a plasma display, or another type of display device. Display 8 includes a plurality of pixels arranged horizontally and vertically in a 2 dimensional (2-D) pixel array. Each pixel of display 8 may be identifiable by its 2-D coordinate, e.g., (x, y) in Cartesian coordinates. For example, the pixel located at the top-left corner of display 8 may be identified as the pixel located at (0, 0). The pixel immediately to the right of the pixel located at (0, 0) may be identified as the pixel located at (1, 0). The pixel immediately below the pixel located at (0, 0) may be identified as the pixel located at (0, 1). All the pixels of display 8 may be similarly identified.

The Cartesian coordinates described above are described for illustration purposes only. The pixels of display 8 may be identifiable by different types of coordinate systems, e.g., polar coordinates, bipolar coordinates, parabolic coordinates, and the like. Furthermore, the example locations of the pixels are also described for illustration purposes only. In some examples, the pixel located at (0, 0) may be at the bottom-left, top-right, bottom-right, or any other pixel location of display 8.

The location of the image surfaces generated by processor 4 may be defined based on at least the coordinates of the image surfaces. In examples where the image surfaces are circles, the location of the surfaces may be based on at least the center coordinate and the radius of the circle. The extent of the image surface, e.g., the perimeter of the image surface, can then be calculated based on the center coordinate and the radius of the circle.

In general, for polygons, the location of the image surfaces may be defined based on at least one or more of the vertex coordinates of the vertices of the image surfaces. The vertex coordinates of the vertices of the image surfaces may identify the extents of the image surfaces. In examples where the image surfaces are rectangles, the location of the image surfaces may be based on the vertex coordinates of the four vertices of the rectangles. In some instances, where the image surfaces are rectangles, at least two vertex coordinates may be sufficient to identify the location and extents of the surfaces. The remaining vertex coordinates can be calculated from the two vertex coordinates. For example, the vertex coordinates may be the $(x_{min}, y_{min})$ coordinate that identifies the top-left vertex of the rectangle, and the $(x_{max}, y_{max})$ coordinate that identifies the bottom-right vertex of the rectangle. The bottom-left vertex of the rectangle is then $(x_{min}, y_{max})$, and the top-right vertex of the rectangle is then $(x_{max}, y_{min})$.

For purposes of illustration, aspects of this disclosure are described in the context of rectangle surfaces. However, the image surfaces should not be considered limited to rectangle surfaces, and may take the form of other polygons, circles, or the like.

Each image surface generated by the execution of the one or more applications includes one or more surface pixels. Processor 4 may assign pixel values, such as color values, e.g. red-green-blue (RGB values) or luma and chroma values, including intensity values and opaqueness values, e.g., alpha values, to each one of the surface pixels for each one of the image surfaces. The pixel values of each surface pixel may indicate the color, brightness, and opaqueness of the surfaces pixels.

The surface pixels represent pixels of the display and are considered to be co-located with pixels on display 8. For example, a surface pixel located at (1, 1) of a first image surface is co-located with the pixel located at (1, 1) of display 8 and represents the pixel located at (1, 1) of display 8. A surface pixel located at (1, 1) of a second image surface is co-located with the surface pixel located at (1, 1) of the first surface and the pixel located at (1, 1) of display 8, and also represents the pixel located at (1, 1) of display 8.

Processor 4 may also determine an order of the image surfaces generated by the execution of the one or more applications. An image surface may partially or fully overlap one or more other image surfaces, for example, when at least parts of the image surfaces are at a substantially similar location. As one example, the vertex coordinates for a first image surface are (1, 1), (5, 1), (1, 5), and (5, 5), and the vertex coordinates for a second image surface are (2, 3), (2, 7), (10, 3), and (10, 7). In this example, the first image surface partially overlaps the second image surface, or vice-versa. From the viewpoint of the user, the image surface that overlaps another image surface may be seen as being in front of the other surface. From the viewpoint of the user, the image surface that is overlapped by another image surface may be seen as being behind the other image surface. The order of the image surfaces may indicate which surface is in front or behind of which other image surfaces.

In some examples, to identify the order of the image surfaces, processor 4 may assign a surface identifier to each image surface. For example, for the back-most image surface, processor 4 may assign the back-most image surface the surface identifier value of 0. The image surface that is immediately in front of the image surface with surface identifier of 0 may be assigned a surface identifier of 1, and so forth. The surface identifier example described above is one example of ordering the image surfaces and aspects of this disclosure should not be considered limited to the ordering example described above. In some examples, processor 4 may not assign a surface identifier to each image surface, and GPU 6 may assign the surface identifier to each image surface, as described below.

The order of the image surfaces may be selected by the user or by processor 4 without user intervention. For example, the user may desire for a selected image surface to be displayed more prominently than other image surfaces. The user may desire that no other image surface overlap the selected image surface, but may allow for the other image surfaces to be overlapped by the selected image surface. In this example, the selected image surface may be considered as being in front of all other image surfaces because no other image surface overlaps the selected image surface. As another example, processor 4 may select which image surface should be displayed more prominently than the other image surfaces based on the type of application being executed. In this example, the image surface selected by processor 4 may overlap other image surfaces, but may not be overlapped by any other image surface. The image surface selected by processor 4 may be considered as being in front of all other image surfaces.

In some examples, processor 4 may transmit the order, location, and surface pixel values of each image surface to storage device 12 for storage. In some examples, processor 4 may transmit the order, location, and surface pixel values of each image surface to graphics processing unit 6 for further processing.

As described above, in some examples, processor 4 may not assign a surface identifier to each image surface. In some of these instances, as one example, GPU 6 may determine the order of the surfaces based on the order in which GPU 6 received the image surfaces from processor 4, or based on the order in which GPU 6 retrieved the image surfaces from storage device 12. In these examples, GPU 6 may assign the surface identifier to each of the image surfaces. GPU 6 may assign the surface identifier values starting from the back-most image surface up to the front-most image surface. For example, GPU 6 may assign the surface identifier value of 0 to the back-most image surface, assign the surface identifier value of 1 to the second back-most image surface, and so forth up to the front-most image surface. In some alternate examples, GPU 6 may assign the surface identifier values starting from the front-most image surface and continuing to the back-most image surface, e.g., GPU 6 may assign the surface identifier value of 0 to the front-most image surface, assign the surface identifier value of 1 to the second front-most image surface, and so forth up to the back-most image surface.

The concept of assigning surface identifier values starting from the back-most image surface and continuing to the front-most image surface, or vice-versa, is provided to ease understanding and for illustration purposes. In general, the image surfaces may be two-dimensional image surfaces. The surface identifier values may be values with which to differentiate between the two-dimensional image surfaces, as well as provide an ordering of the image surfaces, e.g., back-to-front or front-to-back. In some examples, it may be possible for two or more image surfaces to be side-by-side such that none of these side-by-side image surfaces overlap one another. In these instances, each of these side-by-side image surfaces may still be assigned different surface identifier values. The phrase "side-by-side" should not be interpreted to be limited to meaning that these image surfaces are adjoining, but rather that these image surface do not overlap one another, but may overlap some other image surfaces or be overlapped by some other image surfaces.

GPU 6 may process the surface pixels for presentation on display 8. Examples of GPU 6 include, but are not limited to, a DSP, general purpose microprocessor, ASIC, FPGA, or other equivalent integrated or discrete logic circuitry. Although shown as separate in FIG. 1, in some examples, processor 4 may include GPU 6. For example, processor 4 and GPU 6 may be formed within the same DSP, general purpose microprocessor, ASIC, FPGA, or other equivalent integrated or discrete logic circuitry.

Although one GPU 6 is illustrated in FIG. 1, aspects of this disclosure are not so limited. In some examples, device 2 may include a plurality of GPUs or GPU cores, similar to GPU 6. The graphics processing tasks may be split among these GPUs or GPU cores.

GPU 6 may perform various functions on the pixels for presentment on display 8. For example, GPU 6 may perform functions such as shading, blending, illuminating, and others to generate pixel values for the pixels to be displayed on display 8. In some examples, prior to performing functions such as shading, blending, and illuminating, GPU 6 may perform a binning function, also referred to as a tiling function.

For binning, GPU 6 may divide the pixels on display 8 into a plurality of blocks of pixels referred to as tiles. For example, assume that display 8 is configured to include 640×480 pixels. As one example, GPU 6 may divide the display into 10×10 tiles, where each tile includes 64×48 pixels.

For each image surface, in the binning pass, GPU 6 may determine to which tile an image surface belongs. For example, assume that the vertices of an image surface are: (0, 0), (127, 0), (0, 95), and (127, 95). In this example, GPU 6 may determine that this image surface belongs to four tiles of the 10×10 tiles, e.g., the top-left tile, and the tiles immediately to the right, bottom, and diagonal of the top-left tile. GPU 6 may perform similar functions for each image surface. The phrase "binning pass" refers to the binning function performed for one of the image surfaces.

Tile memory 20 may indicate the particular tiles to which an image surface belongs, during the binning pass. In some examples, tile memory 20 may be formed as a part of storage device 12, although aspects of this disclosure are not so limited. GPU 6 may store the surface identifier value for an image surface within appropriate storage locations of tile memory 20 based on which tiles the image surface belongs, during the binning pass for that image surface. Tile memory 20 may be considered as including a plurality of layers. Each layer may correspond to one of the image surfaces. Each layer may be a two-dimensional layer that includes a plurality of storage locations. Each storage location may correspond to one of the tiles of display 8.

For example, GPU 6, when performing the binning pass for the image surface with surface identifier value of 1, may determine that this image surface belongs to top-left tile, and the tile immediately to the right of the top-left tile. In this example, GPU 6 may store the surface identifier value of 1 within the storage locations (0, 0) and (1, 0) of the layer of tile memory 20 that corresponds to the image surface with surface identifier value of 1. Then, GPU 6, when performing the binning pass for the image surface with surface identifier 2, may determine that this image surface belongs to tile immediately to the right of the top-left tile, and the tile that is diagonal to the top-left tile. In this example, GPU 6 may store the surface identifier value of 2 within the storage locations (1, 0) and (1, 1) of the layer of tile memory 20 that corresponds to the image surface with surface identifier value of 2.

The techniques described above to store information about which tiles the image surfaces belong to, and the techniques of the binning pass, are provided for purposes of illustration, and should not be considered as limiting. There may be multiple different present or future techniques to perform a binning pass or to store information about which tiles the image surfaces belong to, and aspects of this disclosure should be considered as extendable to such techniques as well. For example, rather than including a plurality of layers, tile memory 20 may include a linked list of image surfaces that indicate to which tile an image surface belongs. Aspects of this disclosure may be extendable to examples where tile memory 20 includes a linked list.

In some of the examples described in this disclosure, during a binning pass for an image surface, in addition to storing surface identifier values in tile memory 20, GPU 6 may update low resolution buffer 18, which may be a low resolution z-buffer (LRZ) buffer. The phrase "during the binning pass for an image surface" may refer to the binning pass after a previous image surface, and before the binning pass of a next image surface. In some examples, the phrase "during the binning pass for an image surface" may mean in parallel with the binning pass for an image surface.

Low resolution buffer 18 may be a two-dimensional buffer with a plurality of storage locations. In some examples, low resolution buffer 18 may be formed as a part of storage device 12, although aspects of this disclosure are not so limited. As described in more detail, low resolution buffer 18 may promote efficient indication of which pixels should be rendered to avoid unnecessarily rendering pixels that are subsequently occluded. Each storage location in low resolution buffer 18 may correspond to a block of pixels represented on display 8. For instance, a block of 4×4 pixels represented on display 8 may correspond to one storage location in low resolution buffer 18. A block of 4×4 pixels is provided for purposes of illustration, and should not be considered as limiting. Low resolution buffer 18 may be considered as a low resolution buffer because each storage location of low resolution buffer 18 corresponds to a plurality of pixels, rather than a single pixel.

In some examples, the number of storage locations within low resolution buffer 18 may be less than the number of pixels that are to be presented on display 8. For example, if the display included 1000×1000 pixels to be displayed, then the low resolution buffer may include 250×250 storage locations, such that each storage location corresponds to a block of 4×4 pixels. As one example, the block of pixels encompassing (0, 0) and (3, 3) on the display, e.g., the 4×4 block of pixels, may correspond to the first storage location within the low resolution buffer. The block of pixels encompassing (4, 0) to (7, 3) may correspond to the second storage location within the low resolution buffer, and so forth.

During the binning pass for an image surface, GPU 6 may determine whether that image surface includes surface pixels that correspond to a storage location within low resolution buffer 18. For example, GPU 6 may divide the image surface into a plurality of blocks of surface pixels. The size of the blocks of surface pixels may be similar to the size of the blocks of pixels on display 8 that correspond to one storage location in low resolution buffer 18. For instance, if a block of 4×4 pixels on display 8 corresponds to one storage location within low resolution buffer 18, GPU 6 may divide each of the surfaces into blocks of 4×4 surface pixels. As another example, if a block of 8×8 pixels on display 8 corresponds to one storage location within low resolution buffer 18, GPU 6 may divide each of the image surfaces into blocks of 8×8 surface pixels.

It should be noted that although the non-limiting examples described in this disclosure describe GPU 6 determining whether an image surface includes surface pixels that correspond to a storage location within low resolution buffer 18 during the binning pass for that image surface, aspects of this disclosure are not so limited. In some alternate examples, GPU 6 may determine whether an image surface includes surface pixels that correspond to a storage location within low resolution buffer 18 independent of a binning pass. For example, GPU 6 may make such determinations while blending, illuminating, or shading pixel values. As another example, GPU 6 may make such determination right before GPU 6 renders pixel values for storage in frame buffer 10, as described below.

The plurality of blocks of surface pixels should not be confused with the tiles described above. GPU 6 divides the pixels on display 8 into tiles to determine which surface pixels of an image surface belong to which tiles. This tiling may occur before GPU 6 divides the surface pixels of a given image surface into the plurality of blocks of surface pixels. In other words, each tile encompasses a block of pixels on display 8. Each of the plurality of blocks of surface pixels encompasses a block of surface pixels within an image surface. For instance, in the above examples, a tile includes 64×48 pixels on the display, whereas GPU 6 may divide an image surface into a plurality of 4×4 blocks of surface pixels of the image surface. However, in some example, it may be possible for the size to the tile to be substantially similar to the size of the plurality of blocks of surface pixels of the image surface. For example, the size of tile may be 8×8 blocks of pixels on display 8, and the size of the plurality of blocks of surface pixels of the image surface may also be 8×8.

For each block of surface pixels within an image frame, GPU 6 may store the surface identifier within corresponding storage locations of low resolution buffer 18. For example, each block of surface pixels belongs to a particular image surface with a surface identifier. GPU 6 may store the surface identifier within corresponding storage location of low resolution buffer 18. The corresponding storage locations of low resolution buffer 18, within which GPU 6 store the surface identifier, may be based on the corresponding block of pixels on display 8. For example, as described above, each block of surface pixels may correspond to a block of pixels on display 8, which in turn correspond to a storage location within low resolution buffer 18.

As one example, for illustration purposes, a first storage location within low resolution buffer 18 may correspond to a block of pixels on display 8 encompassing pixels (0, 3) to (3, 3). If an image surface identified as 1, e.g., the surface identifier value is 1, includes a block of surface pixels encompassing pixels (0, 3) to (3, 3) on display 8, GPU 6 may store the surface identifier value of 1 within the first storage location of the low resolution buffer. In some examples, the surface identifier value may be represented as an 8-bit binary value. In these examples, each of the storage location of low resolution buffer 18 may be configured to store 8-bit binary values.

For each of the blocks of pixels within a first image surface, during the binning pass of the first image surface, GPU 6 may store the surface identifier value for the first image surface within the corresponding storage locations of low resolution buffer 18. GPU 6 may then proceed with the second image surface. During the binning pass for the second image surface, for each of the blocks within the second image surface, GPU 6 may store the surface identifier value for the second image surface within the corresponding storage locations of low resolution buffer 18, and so forth.

In some instances, it may be possible that the second image surface partially or fully occludes the first image surface. For example, the second image surface may include surface pixels that are co-located with the first image surface. Co-located surface pixels may be surface pixels on different image surfaces that are located in identical locations on display 8. In this example, a block of surface pixels of the first image surface may be fully occluded with the block of surface pixels of the second image surface. In these instances, the storage location in low resolution buffer 18 for the block of surface pixels of the first image surface may also correspond to the storage location for the co-located block of surface pixels of the second image surface.

In this example, when performing the binning pass for the first image surface, GPU 6 may store the surface identifier value of the first image surface for the block of surface pixels of the first image surface within the corresponding storage locations of low resolution buffer 18. When performing the binning pass for the second image surface, GPU 6 may store the surface identifier value of the second image surface for the blocks of surface pixels that are fully co-located with the blocks of surface pixels of the first image surface within the corresponding storage locations of low resolution buffer 18. In other words, GPU 6 may update the surface identifier value stored in the corresponding storage locations of low resolution buffer 18 with the surface identifier of the second image surface for all blocks of surface pixels of the second image surface that fully occlude blocks of surface pixels of the first image surface.

In some instances, a block of surface pixels for the second image surface may not fully occlude a block of surface pixels for the first image surface. For example, assume a block of surface pixels for the first image surface include pixels encompassing (0, 0) to (3, 3) on display 8. Also, assume that a block of surface pixels for the second image surface include pixels encompassing (0, 2) to (5, 3) on display 8. In this example, the block of surface pixels for the second image surface only partially occludes the block of surface pixels for the first image surface. For example, the block of surface pixels for the second image surface only occludes the surface pixels that encompass (0, 2) to (3, 3) on the first image surface, and does not occlude any of the other pixels. In this example, because the block of surface pixels for the second image surface does not fully occlude the block of surface pixels for the first image surface, GPU 6 may not update the corresponding storage location within low resolution buffer 18 with the surface identifier for the second image surface.

After updating low resolution buffer 18 with the surface identifier values, GPU 6 may render an image to frame buffer 10 based on the surface identifier values stored in low resolution buffer 18. Frame buffer 10 may be a two-dimensional buffer that includes a plurality of storage locations. The number of storage locations within frame buffer 10 may be substantially similar to the number of pixels to be displayed on display 8. For example, if display 8 is configured to include 640×480 pixels, frame buffer 10 may include 640×480 storage locations. Frame buffer 10 may store the final pixel values for each of the pixels processed by GPU 6. Display 8 may retrieve the final pixel values from frame buffer 10, and display the final image based on the pixel values stored in frame buffer 10.

GPU 6 may determine which pixels to process, e.g., by performing pixel shading, blending, and illuminating, based on the surface identifier values stored in low resolution buffer 18. Such pixel shading, blending, and illuminating may occur in a fragment shader stage of GPU 6. In this manner, GPU 6 may be configured to cull pixels that do not contribute to the final image, and may not waste computational resources on pixels that do not contribute to the final image. For example, GPU 6 may cull pixels that do not contribute to the final image, based on the values stored in low resolution buffer 18, before the pixels enter the fragment shader stage.

For instance, at the conclusion of the binning pass for each of the image surfaces, low resolution buffer 18 may store surface identifier values for each of the surfaces that contributes to the final image. Also, because each storage location of low resolution buffer 18 corresponds to a plurality of block of pixels on display 8, the surface identifier value stored in each of the storage locations of low resolution buffer 18 may indicate which image surface contributes to those plurality of block of pixels on display 8 in the final image.

For example, assume that the first storage location in low resolution buffer 18 stores the surface identifier value of 3. Also, assume that the first storage location in low resolution buffer 18 corresponds to pixels that encompass the (0, 0) to (3, 3) coordinates on display 8. In this example, GPU 6 may render the pixels that encompass the (0, 0) to (3, 3) coordinates in the image surface with surface identifier 3, and store the resulting pixel values in corresponding locations of frame buffer 10, e.g., storage locations that encompass (0, 0) to (3, 3) in frame buffer 10.

In this example, because the first storage location in low resolution buffer 18 stored the surface identifier value of 3, GPU 6 may recognize that any image surface with a surface identifier less than 3 does not contribute to the final image (assuming that image surface are ordered from back-to-front). Also, in this example, assume that an image surface, with surface identifier value of 2, also included pixels that encompass (0, 0) to (3, 3) on display 8. In this example, because the first storage location in low resolution buffer 18 stores a surface identifier value of 3, GPU 6 may recognize that the sixteen pixels located between (0, 0) and (3, 3) in the image surface with surface identifier value of 2 do not contribute to the final image. In other words, these pixels of the image surface with surface identifier value of 2 are fully occluded by the co-located pixels of the image surface with surface identifier value of 3. In this example, GPU 6 may be able to cull (e.g., eliminate from rendering) these sixteen pixels of the image surface with surface identifier value of 2, and may not waste computational resources processing these sixteen pixels of the image surface with surface identifier value of 2.

In this manner, aspects of the disclosure may promote efficient GPU processing. For example, in some of the example implementation described in this disclosure, GPU 6 may be able to cull entire blocks of pixels from further processing, rather than on a pixel by pixel basis. Furthermore, for some two-dimensional graphics processing, a conventional GPU may not assign surface identifiers, and may render entire image surfaces. Such rendering may be inefficient because the conventional GPU renders image surfaces which may be later occluded. The examples described in this disclosure allow GPU 6 to determine, ahead of rendering, which image surfaces contribute to the final image, and allow GPU 6 to process only those pixels.

Also, as described above, GPU 6 may store the surface identifier value for an image surface during the binning pass for that image surface. Because GPU 6 may store the surface identifier value for an image surface during the binning pass, the latency associated with storing the surface identifier value may be minimized. For example, GPU 6 may already be configured to perform the binning pass as part of its graphics processing. Rather than waiting until all of the binning is completed for each of the image surfaces, and then storing surface identifiers in low resolution buffer 18, the example implementations described in this disclosure allow GPU 6 to store the surface identifier values during the binning pass, thereby further promoting efficient GPU 6 processing.

In some examples, GPU 6 may render the image on a tile-by-tile basis. For example, as described above, GPU 6 may divide display 8 into 10×10 tiles, where each tile includes 64×48 pixels. In some of these examples, GPU 6 may render the image starting from a first tile of the 10×10 tiles, then proceed to the next tile of the 10×10 tiles, and so forth.

To render the image for a certain tile, GPU 6 may retrieve the values stored in low resolution buffer 18 that correspond to the pixels within that tile. For example, in the above examples, each storage location within low resolution buffer 18 corresponds to a 4×4 block of pixels, and each tile includes 64×48 pixels. Accordingly, in this example, each tile corresponds to 192 storage locations within low resolution buffer 18, e.g., 64×48 divided by 4×4 equals 192.

GPU 6 may retrieve the values stored in the 192 storage locations within low resolution buffer 18 for the tile which is to be rendered. In one example, GPU 6 may store the retrieved values within a fast dedicated memory of GPU 6 such as a cache (e.g., a L2 cache). In an alternate example, GPU 6 may store the retrieved values within local memory of GPU 6. In some examples, when GPU 6 stores the retrieved values within local memory of GPU 6, GPU 6 may expand the values within low resolution buffer 18.

For example, the local memory within GPU 6 may include 64×48 storage locations for a single tile because each tile includes 64×48 pixels in this example. In this example, assume that storage location 15 within low resolution buffer 18 corresponds to a first 4×4 block of pixels within the 64×48 pixels. The first 4×4 block of pixels within the 64×48 pixels may correspond to the first 4×4 storage locations of the 64×48 storage locations within the local memory of GPU 6. In this example, GPU 6 may store the surface identifier value of storage location 15 within low resolution buffer 18 into each of the first 4×4 storage locations of the 64×48 storage locations within the local memory of GPU 6.

In the examples described above, GPU 6 may update low resolution buffer 18 with the surface identifier value for an image surface during the binning pass for that image surface. In some examples, an image surface may be a transparent image surface, or a image surface with conditional kill operation. A transparent image surface may not occlude any other image surface due to its transparency. Because a transparent image surface does not occlude any other image surface, GPU 6 may not update low resolution buffer 18 with the surface identifier value of a transparent image surface, during the binning pass for a transparent image; although aspects of this disclosure should not be considered so limiting.

A conditional kill operation may be a special case of a transparent image surface. In the conditional kill operation, some surface pixels of an image surface may be discarded (e.g., not rendered) due to some conditional logic, algorithm, or texture surface. The conditional kill operation may create "holes" within an image surface, thereby rendering the image surface as being practically transparent. Due to the "holes" within an image surface with conditional kill, GPU 6 may not update low resolution buffer 18 with the surface identifier value of an image surface with conditional kill, during the binning pass of such an image surface; although aspects of this disclosure should not be considered so limiting.

Transparent image surfaces and image surfaces with conditional kill may still be rendered by GPU 6. During the rendering of a transparent image surface or an image surface with conditional kill, GPU 6 may determine which portion of these types of images contribute to the final image. For example, although a transparent image surface may not occlude any other surface, portion of the transparent image or the entirety of the transparent image may be occluded by another image surface. By comparing the surface identifier value of the transparent image surface or image surface with conditional kill with the stored surface identifier value for blocks of pixels that correspond to blocks of surface pixels of the transparent image surface or image surface with conditional kill, GPU 6 may be able to determine which portions of the transparent image surface or image surface with conditional kill should be rendered, and which portions should be culled from rendering.

Figure 2A:
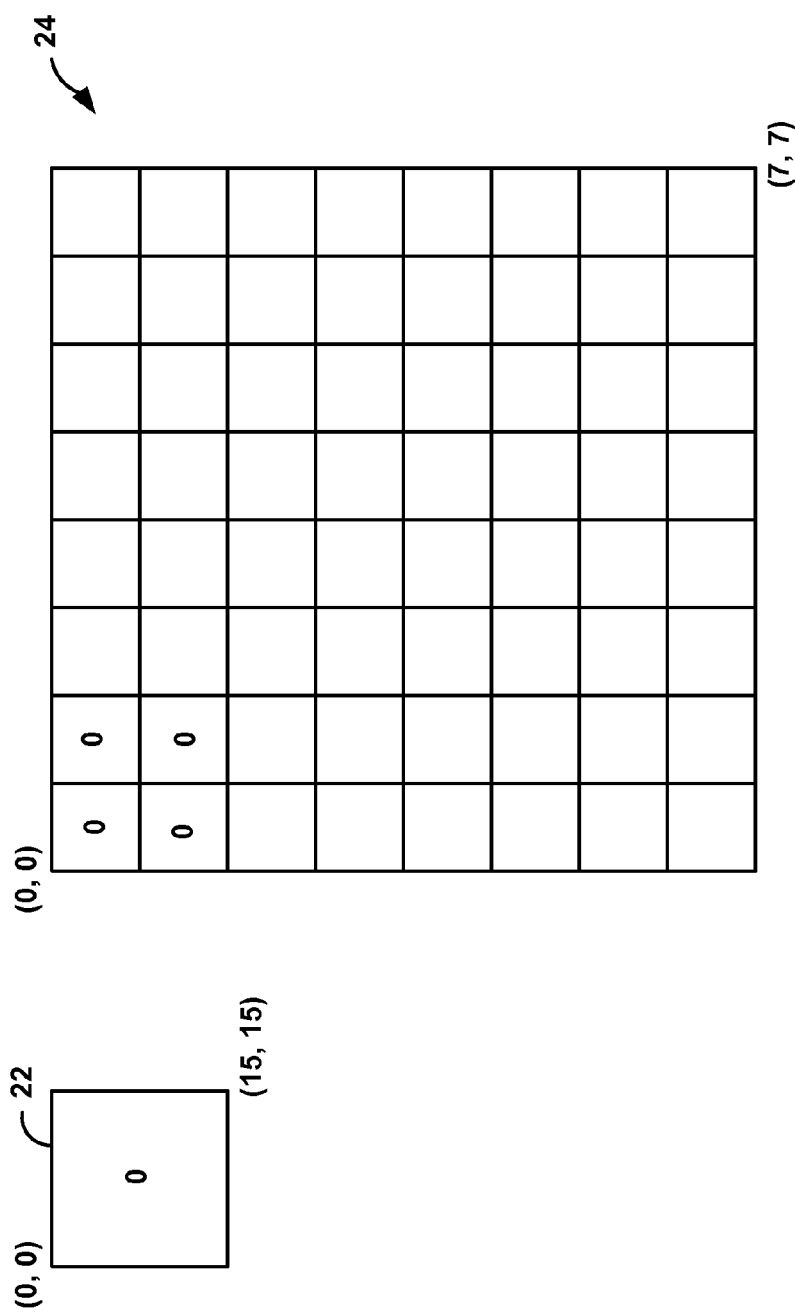
FIG. 2A is a graphical diagram illustrating a binning pass of a first image surface.
Figure 2B:
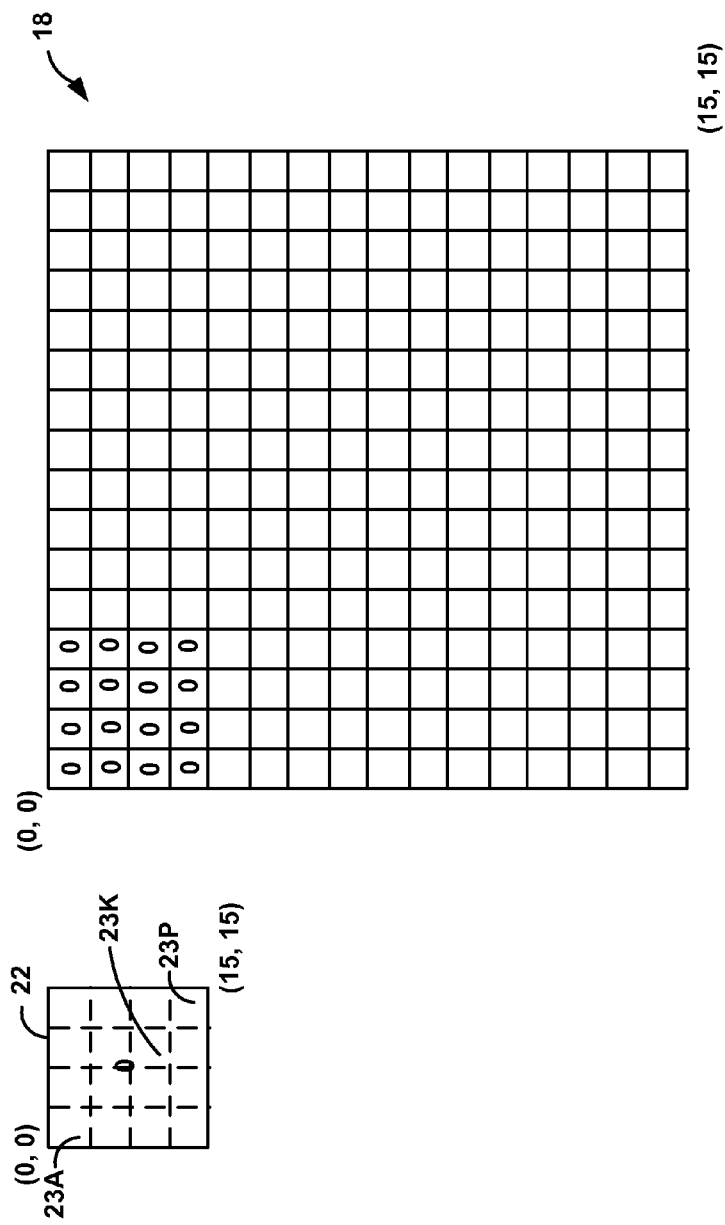
FIG. 2B is a graphical diagram illustrating an updated low resolution buffer of FIG. 1 during the binning pass of the first image surface of FIG. 2A.
Figure 2C:
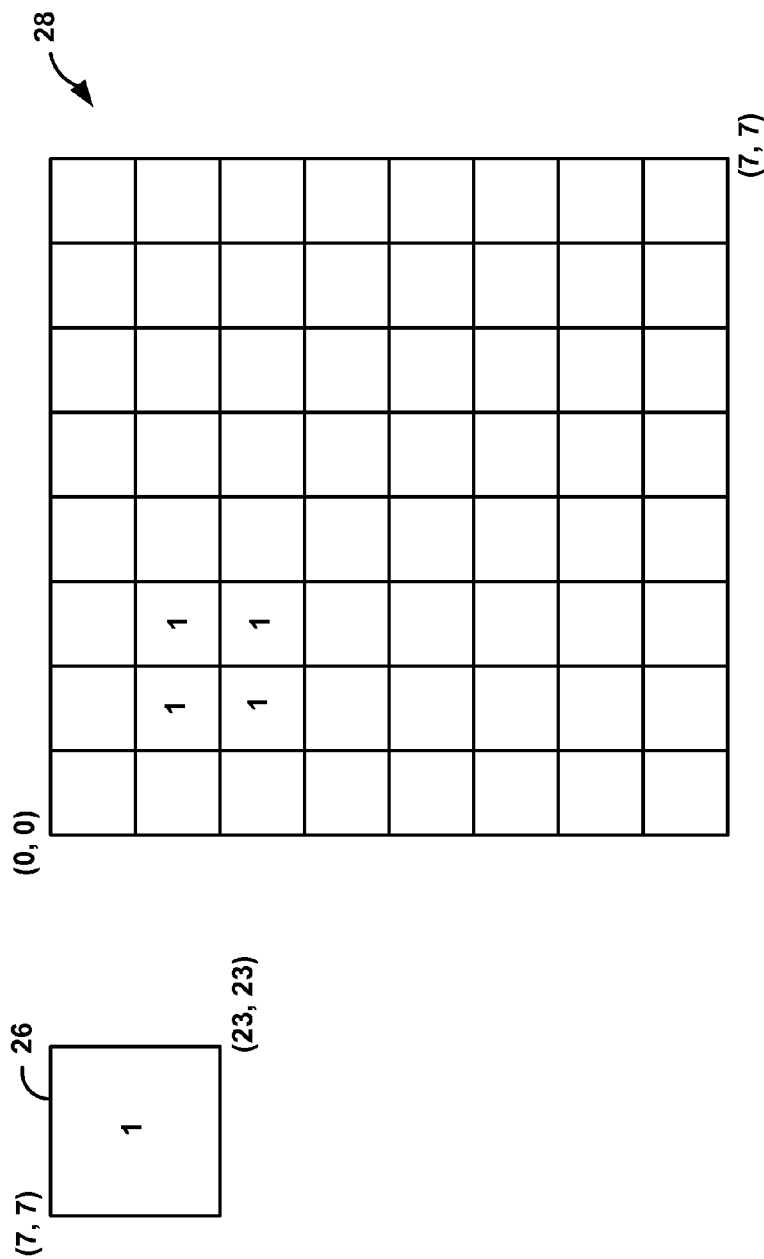
FIG. 2C is a graphical diagram illustrating a binning pass of a second image surface.
Figure 2D:
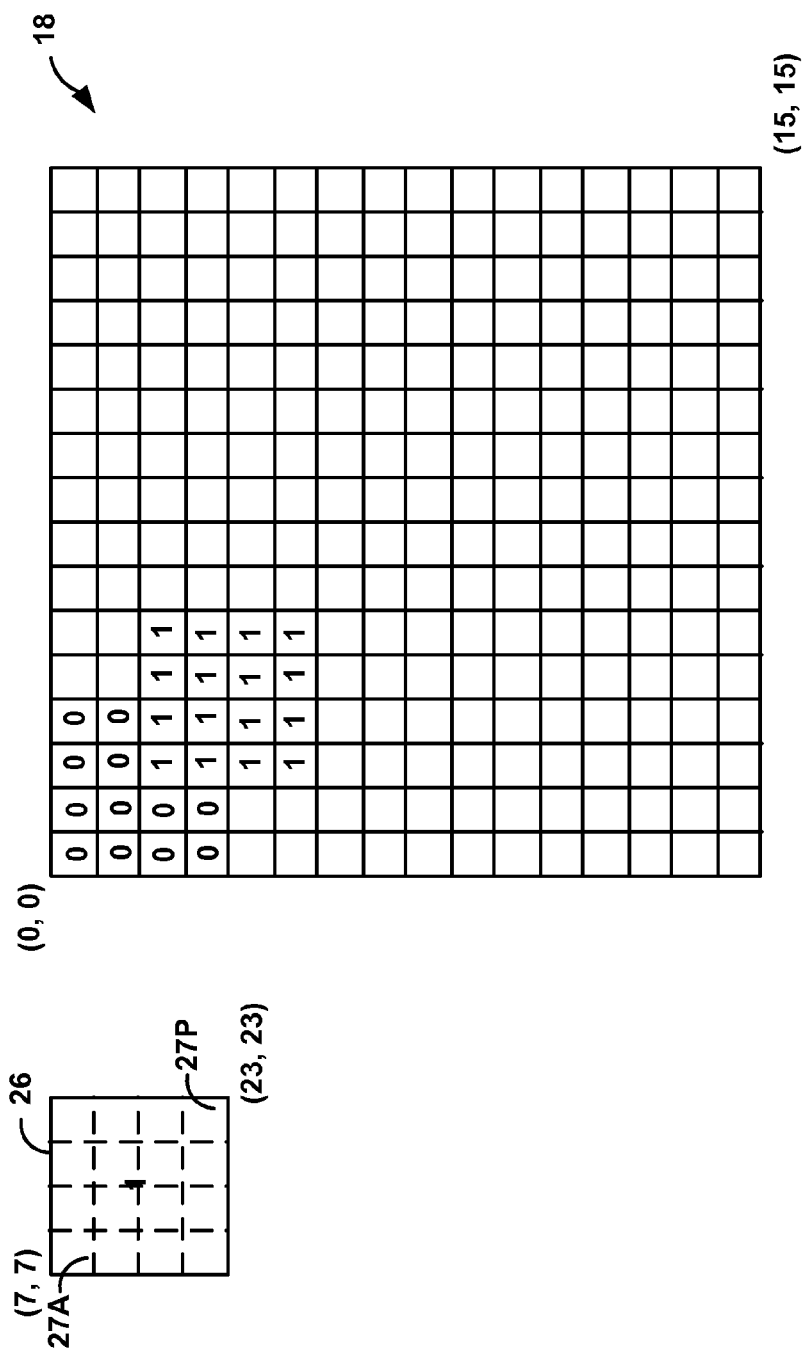
FIG. 2D is a graphical diagram illustrating an updated low resolution buffer of FIG. 1 during the binning pass of the second image surface of FIG. 2C.
Figure 2E:
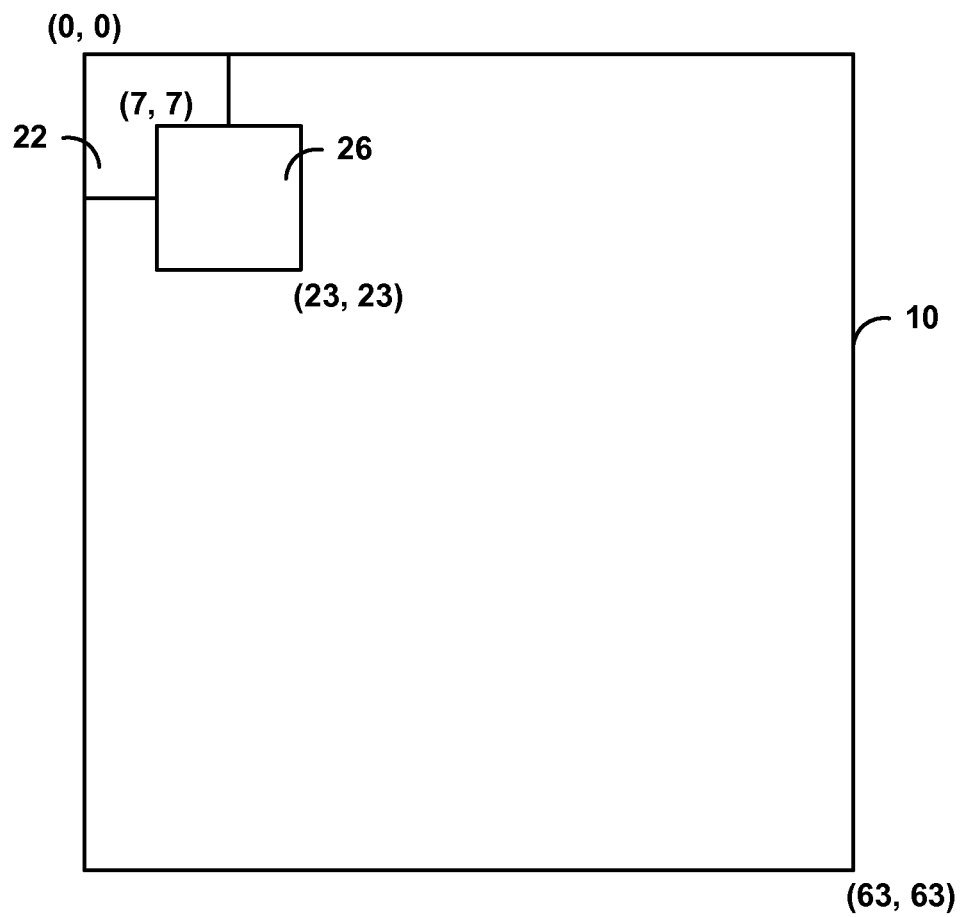
FIG. 2E is a graphical diagram illustrating the first and second image surfaces of FIGS. 2A-2D in a frame buffer of FIG. 1.

FIG. 2A is a graphical diagram illustrating a binning pass of a first image surface. FIG. 2B is a graphical diagram illustrating an updated low resolution buffer 18 during the binning pass of the first image surface of FIG. 2A. FIG. 2C is a graphical diagram illustrating a binning pass of a second image surface. FIG. 2D is a graphical diagram illustrating an updated low resolution buffer 18 during the binning pass of the second image surface of FIG. 2C. FIG. 2E is a graphical diagram illustrating the first and second image surfaces of FIGS. 2A-2D in frame buffer 10.

In the examples of FIGS. 2A-2E, display 8 may include 64×64 pixels. Also, the examples of FIGS. 2A-2E illustrate two image surfaces for purposes of illustration and to ease understanding. In other examples, there may be more than two image surfaces that are generated by processor 4 and processed by GPU 6.

FIG. 2A illustrates image surface 22, which may have been generated by processor 4. Image surface 22 may include 16×16 surface pixels with vertex coordinates of (0, 0), (0, 15), (15, 0), and (15, 15). Image surface 22 may be the back-most image surface, and processor 4 or GPU 6 may assign image surface 22 the surface identifier value of 0. In some examples, GPU 6 may perform the binning pass starting from the back-most image surface, and continuing to the front-most image surface. Accordingly, in this example, GPU 6 may perform the binning pass starting with image surface 22.

For ease of understanding, this example assumes that image surface 22 is the back-most image surface. In many instances, the background of display 8 may be considered as the back-most image surface, and would be assigned the surface identifier value of 0. In these instances, image surface 22 would be assigned the surface identifier value of 1. Also, in these instances, image surface 26, described with respect to FIGS. 2C and 2D, would be assigned the surface identifier value 2. In these instances, in the examples described below, the surface identifier value of image surface 22 may be 1, and the surface identifier value of image surface 26 may be 2 where the background of display 8 is assigned the surface identifier value of 0.

Layer 24, illustrated in FIG. 2A, may be one of the layers of tile memory 20 that corresponds to the image surface with surface identifier value of 0, e.g., image surface 22 in this example. As illustrated, layer 24 may include 8×8 storage locations, where each storage location corresponds to one tile of display 8. As described above, in the example of FIG. 2A, display 8 may include 64×64 pixels. Therefore, in this example, one tile may include 8×8 pixels. In the example of FIG. 2A, the coordinates of the first storage location of layer 24 may be (0, 0). The coordinates of the storage location immediately to the right of the first storage location of layer 24 may be (1, 0), and so forth, continuing to the storage location of layer 24 located at (7, 7).

GPU 6 may determine the tiles to which image surface 22 belongs. As described, in the example of FIG. 2A, each tile includes 8×8 pixels. Also, in the example of FIG. 2A, image surface 22 includes four blocks of 8×8 pixels, e.g., a block from (0, 0) to (7, 7), a block from (0, 7) to (7, 15), a block from (7, 0) to (15, 7), and block from (7, 7) to (15, 15). Accordingly, in this example, image surface 22 belongs to four tiles, i.e., because there are four blocks of 8×8 pixels in image surface 22 and each tile includes 8×8 pixels.

As illustrated in FIG. 2A, layer 24 may store the surface value identifier for image surface 22 in locations that correspond to the tiles to which image surface 22 belongs. For example, storage locations (0, 0), (0, 1), (1, 0), and (1, 1) of layer 24 each store the surface value identifier for image surface 22, e.g., the value of 0. In this example, storage locations (0, 0), (0, 1), (1, 0), and (1, 1) of layer 24 correspond to the tiles to which image surface 22 belongs.

FIG. 2B illustrates updates to low resolution buffer 18 which GPU 6 may update during the binning pass of image surface 22 illustrated in FIG. 2A. In the example of FIG. 2B, low resolution buffer 18 includes 16×16 storage locations. As described above, in the example of FIG. 2B, display 8 may include 64×64 pixels. Therefore, in the example of FIG. 2B, each storage location of low resolution buffer 18 may correspond to 4×4 blocks of pixels. For example, the storage location of low resolution buffer 18 located at (0, 0) may correspond to pixels located at (0, 0) to (3, 3) on display 8. The storage location of low resolution buffer 18 located at (1, 0) may correspond to pixels located (3, 0) to (7, 3) on display 8, and so forth. For example, the storage location of low resolution buffer 18 located at (15, 15) may correspond to pixels located (59, 59) to (63, 63) on display 8.

In the example of FIG. 2B, during the binning pass of image surface 22, GPU 6 may divide image surface 22 into a plurality of blocks of surface pixels of image surface 22. For example, GPU 6 may divide image surface 22 into sixteen blocks of 4×4 surface pixels, e.g., 16×16 divided by sixteen equals 4×4. These sixteen blocks of image surface 22 are illustrated as blocks 23A-23P (collectively referred to as "blocks 23").

Each of blocks 23, e.g., each of these sixteen blocks of 4×4 surface pixels of image surface 22, may correspond to one storage location of low resolution buffer 18. For example, the storage location of low resolution buffer 18 located at (0, 0) may correspond to the block 23A of the sixteen blocks of 4×4 surface pixels, e.g., the surface pixels of image surface 22 that encompass (0, 0) to (3, 3). The storage location of low resolution buffer 18 located at (1, 0) may correspond to the block 23B of the sixteen blocks of 4×4 surface pixels, e.g., the surface pixels of image surface 22 that encompass (3, 0) to (7, 3), and so forth.

During the binning pass of image surface 22, GPU 6 may store the surface identifier value of image surface 22 within storage locations of low resolution buffer 18 that correspond to blocks of surface pixels of image surface 22. For example, as illustrated in FIG. 2B, the storage location located at (0, 0) in low resolution buffer 18 stores the surface identifier value of 0 because the storage location located at (0, 0) in low resolution buffer 18 corresponds to pixels located at (0, 0) to (3, 3) on display 8 and image surface 22 includes surface pixels that encompass (0, 0) to (3, 3) on display 8, e.g., block 23A. Similarly, the storage locations located at (0, 0) to (3, 3) in low resolution buffer 18 store the surface identifier value of 0 because image surface 22 includes blocks of surface pixels, e.g., blocks 23A-23P, that each correspond to these storage locations of low resolution buffer 18.

After completing the binning pass for image surface 22 and updating low resolution buffer 18, GPU 6 may proceed with the binning pass for the second back-most image surface. FIG. 2C illustrates image surface 26, which may have been generated by processor 4. Similar to image surface 22 of FIGS. 2A and 2B, image surface 26 may include 16×16 surface pixels. The vertex coordinates of image surface 26 are (7, 7), (7, 23), (23, 7), and (23, 23). Based on the vertex coordinates of image surface 22 and 26, image surface 26 partially overlaps image surface 22.

In the example of FIG. 2C, image surface 26 may be the second back-most image surface. In this example, processor 4 or GPU 6 may assign image surface 26 the surface identifier value of 1. In the example of FIG. 2C, GPU 6 may have completed the binning pass of image surface 22, and may now perform the binning pass of image surface 26 because image surface 26 is the second back-most image surface.

Layer 28, illustrated in FIG. 2C, may be one of the layers of tile memory 20 that corresponds to the image surface with surface identifier value of 1, e.g., image surface 26 in this example. Similar to layer 24 of FIG. 2A, layer 28 may include 8×8 storage location, where each storage location corresponds to one tile of display 8, which may include 8×8 pixels on display 8.

GPU 6 may determine to which tiles image surface 26 belongs. Similar to image surface 22, image surface 26 includes four blocks of 8×8 pixels, e.g., a block from (7, 7) to (15, 15), a block from (7, 15) to (15, 23), a block from (15, 7) to (23, 15), and a block from (15, 15) to (23, 23). Accordingly, in this example, image surface 26 belongs to four tiles.

As illustrated in FIG. 2C, layer 28 may store the surface value identifier for image surface 26 in locations that correspond to the tiles to which image surface 26 belongs. For example, storage locations (1, 1), (2, 1), (1, 2), and (2, 2) of layer 28 each store the surface value identifier for image surface 26, e.g., the value of 1. In this example, storage locations (1, 1), (2, 1), (1, 2), and (2, 2) of layer 28 correspond to the tiles to which image surface 26 belongs.

FIG. 2D illustrates updates to low resolution buffer 18 which GPU 6 may update during the binning pass of image surface 26 illustrated in FIG. 2C. As described above, in this example, low resolution buffer 18 includes 16×16 storage locations that each correspond to 4×4 blocks of pixels.

In the example of FIG. 2D, during the binning pass of image surface 26, GPU 6 may divide image surface 26 into a plurality of blocks of surface pixels of image surface 26. For example, GPU 6 may divide image surface 26 into sixteen blocks of 4×4 surface pixels, e.g., 16×16 divided by sixteen equals 4×4. These sixteen blocks of image surface 26 are illustrated as blocks 27A-27P (collectively referred to as "blocks 27").

Each of blocks 27, e.g., each of these sixteen blocks of 4×4 surface pixels of image surface 26, may correspond to one storage location of low resolution buffer 18. For example, the storage location of low resolution buffer 18 located at (2, 2) may correspond to the block 27A of the sixteen blocks of 4×4 surface pixels, e.g., the surface pixels of image surface 26 that encompass (7, 7) to (11, 11). The storage location of low resolution buffer 18 located at (3, 2) may correspond to block 27B of the sixteen blocks of 4×4 surface pixels, e.g., the surface pixels of image surface 26 that encompass (11, 7) to (15, 11), and so forth.

During the binning pass of image surface 26, GPU 6 may store the surface identifier value of image surface 26 within storage locations of low resolution buffer 18 that correspond to blocks of surface pixels of image surface 26. For example, GPU 6 may update the storage locations of low resolution buffer 18 with the surface value identifier for image surface 26 that correspond to blocks of 4×4 surface pixels of image surface 26. For instance, as illustrated in FIG. 2D, the storage location located at (2, 2) in low resolution buffer 18 stores the surface identifier value of 1 because the storage location located at (2, 2) in low resolution buffer 18 corresponds to pixels located at (7, 7) to (11, 11) on display 8 and image surface 26 includes surface pixels that encompass (7, 7) to (11, 11) on display 8, e.g., block 27A. Similarly, the storage locations located at (2, 2) to (5, 5) in low resolution buffer 18 store the surface identifier value of 1 because image surface 26 includes blocks of surface pixels, e.g., blocks 27A-27P, that each correspond to these storage locations of low resolution buffer 18.

In the example of FIG. 2D, GPU 6 may update the surface identifier value stored in low resolution buffer 18 if an overlapping image surface fully overlaps the block of pixels that are associated with a storage location of low resolution buffer 18. For example, in FIG. 2B, GPU 6 stored the surface identifier value of 0 for image surface 22 in storage location (2, 2) of low resolution buffer 18. Storage location (2, 2) of low resolution buffer 18 may correspond to pixels located between (7, 7) and (11, 11) on display 8. Then, during the binning pass for image surface 26, GPU 6 stored the surface identifier value of 1 for image surface 26 in storage location (2, 2) of low resolution buffer 18 because image surface 26 overlaps image surface 22.

While updating low resolution buffer 18 during the binning pass of image surface 26 at least three situations may arise. In a first situation, a block of pixels in image surface 26 is fully co-located with a block of pixels in image surface 22. In a second situation, a block of pixels in image surface 26 is not co-located with any of the blocks of pixels in image surface 22. In a third situation, a block of pixels in image surface 26 is partially co-located with a block of pixels in image surface 22.

As one example of the first situation, block 27A of image surface 26 is fully co-located with block 23K of image surface 22. The term "fully co-located" means that the ends of a block in image surface 26 are the same as the ends of a block in image surface 22. For example, the coordinates of block 23K of image surface 22 are (7, 7) to (11, 11), and the coordinates of block 27A of image surface 26 are also (7, 7) to (11, 11).

When a block of pixels, e.g., block 27A, of image surface 26 is fully co-located with a block of pixels, e.g., block 23K, of image surface 22, GPU 6 may update the surface identifier value with the surface identifier value of image surface 26 in the storage location of low resolution buffer 18 that corresponds to blocks 23K and 27A. For example, storage location of low resolution buffer 18 located at (2, 2) corresponds to both block 23K and 27A. In this example, during the binning pass of image surface 26, GPU 6 may update the surface identifier value stored in location (2, 2) of low resolution buffer 18 with the value of 1, e.g., the surface identifier value of image surface 26, as shown in FIG. 2D.

As one example of the second situation, block 27P of image surface 26 is not co-located with any of blocks 23 of image surface 22. For example, the coordinates of block 27P of image surface 26 are (19, 19) to (23, 23). Image surface 22 includes no blocks that encompass coordinates (19, 19) to (23, 23). For example, the coordinates of the last block of surface pixels of image surface 22, e.g., block 23P, are (11, 11) to (15, 15).

When a block of pixels, e.g., block 27P, of image surface 26 is not co-located with any block of pixels, e.g., blocks 23, of image surface 22, GPU 6 may update the surface identifier value with the surface identifier value of image surface 26 in the storage location of low resolution buffer 18 that corresponds to block 27P. For example, storage location of low resolution buffer 18 located at (5, 5) corresponds to block 27P. In this example, during the binning pass of image surface 26, GPU 6 may update the surface identifier value stored in (5, 5) of low resolution buffer 18 with the value of 1, e.g., the surface value of image surface 26, as shown in FIG. 2D.

In the example of the first situation, the storage location of low resolution buffer 18 located at (2, 2) in low resolution buffer 18 corresponds to pixels located between (7, 7) and (11, 11) on display 8. Also, in the examples of FIGS. 2A-2D, both image surface 22 and image surface 26 included pixels located between (7, 7) and (11, 11), e.g., block 23K of image surface 22, and block 27A of image surface 26. However, as one example of the third situation, it may be possible that the overlapping image surface does not encompass the entirety of the blocks of pixels on display 8 that correspond to the storage location located at (2, 2) in low resolution buffer 18. For instance, a block of pixels in image surface 26 is partially co-located with a block of pixels in image surface 22. The term "partially co-located" means only a part of a block of pixels of image surface 26 overlaps a part of a block of pixels of image surface 22.

For example, assume that vertices of image surface 26 are (8, 8), (8, 23), (23, 8), and (23, 23). In other words, in this example, the top-left vertex of image surface 26 is (8, 8) instead of (7, 7) as in the examples of FIGS. 2C and 2D. In this example, during the binning pass of image surface 26, GPU 6 may not update the surface identifier value stored at (2, 2) in low resolution buffer 18 because image surface 26 does not encompass the entirety of the blocks of pixels on display 8 that correspond to display 8, e.g., location (2, 2) in low resolution buffer 18 corresponds to (7, 7) to (11, 11) on display 8, whereas image surface 26 starts at (8, 8). In these instances, the surface identifier value stored at (2, 2) may remain the surface identifier value of image surface 22, e.g., surface identifier value of 0. In this example, GPU 6 may not store the surface identifier value of image surface 26 in location (2, 2) of low resolution buffer 18 because a block of pixels of image surface 26 are only partially co-located with a block of pixels in image surface 22.

In this example, e.g., where the vertex of image surface 26 starts at (8, 8), during the rendering pass, GPU 6 may experience some minor inefficiencies in resolving which display pixels on display 8 correspond to which image surface. However, the graphics processing efficiencies gained from culling entire blocks of pixels during graphics rendering may outweigh any of these minor graphics processing inefficiencies.

FIG. 2E is a graphical diagram illustrating the image surface 22 and image surface 26 of FIGS. 2A-2D in frame buffer 10. As described above, frame buffer 10 may include a plurality of storage locations, and the number of storage locations in frame buffer 10 may be substantially similar to the number of pixels on display 8. For example, in the example of FIG. 2E, frame buffer 10 includes 64×64 storage locations, and display 8 includes 64×64 pixels.

Each one of the storage locations of frame buffer 10 may store pixel values, such as color values, e.g., RGB or luma and chroma values, and opaqueness values, e.g., alpha values. GPU 6 may generate the pixel values for each pixel during its rendering pass for storage in frame buffer 10.

For the rendering pass, GPU 6 may implement its fragment shader for shading, blending, and illuminating, as a few examples, the pixels. In some example implementations of this disclosure, GPU 6 may determine which surface pixels from which image surfaces should be provided to the fragment shader based on the surface identifier values stored in low resolution buffer 18.

For example, in the rendering pass, GPU 6 may determine which portions of image surface 22 and image surface 26 contribute to the final image illustrated in FIG. 2E based on the surface values stored in low resolution buffer 18. For instance, based on the surface identifier values stored in low resolution buffer 18, GPU 6 may determine which portions of image surface 22 are overlapped by which portions of image surface 26 based on the surface identifier values stored in low resolution buffer 18. Based on the determination, GPU 6 may render the portions of image surface 22 that are not overlapped by image surface 26. Also, based on the determination, GPU 6 may eliminate from rendering (e.g., culling) portions of image 22 that are overlapped by image surface 26.

As one example, in the rendering pass, GPU 6 may determine that image surface 22 contributes to pixels (0, 0) to (3, 3) on display 8 because low resolution buffer 18, as illustrated in FIG. 2D, stores the surface identifier value of image surface 22, e.g., the value of 0, in the storage location located at (0, 0) in low resolution buffer 18. Also, the storage location located at (0, 0) in low resolution buffer 18 corresponds to pixels (0, 0) to (3, 3) in display 8. Accordingly, in the example illustrated in FIG. 2E, in the storage locations located between (0, 0) and (3, 3) in frame buffer 10, frame buffer 10 stores the pixel values, generated from the fragment shader of GPU 6, of image surface 22.

As another example, in the rendering pass, GPU 6 may determine that image surface 26 contributes to the pixels (7, 7) to (11, 11) on display 8 because low resolution buffer 18, as illustrated in FIG. 2D, stores the surface identifier value of image surface 26, e.g., the value of 1, in the storage location located at (2, 2) in low resolution buffer 18. Also, the storage location located at (2, 2) in low resolution buffer 18 corresponds to pixels (7, 7) to (11, 11) in display 8. Accordingly, in the example illustrated in FIG. 2E, in the storage locations located between (7, 7) and (11, 11) in frame buffer 10, frame buffer 10 stores the pixel values, generated from the fragment shader of GPU 6, of image surface 26.

As described above, in the examples of FIGS. 2A-2E, image surface 22 may also include surface pixels between (7, 7) and (11, 11) on display 8. However, this block of surface pixels of image surface 22 are fully occluded by the co-located block of surface pixels of image surface 26. In this example, there may be no need for GPU 6 to process the surface pixels between (7, 7) and (11, 11) of image surface 22 due to the occlusion. In some examples, because low resolution buffer 18 indicates that only image surface 26 contributes to the pixels located between (7, 7) and (11, 11) on display 8, GPU 6 may cull (e.g., eliminate from rendering) the surface pixels between (7, 7) and (11, 11) of image surface 22 and not waste graphics computational resources in graphics processing these pixels. In this manner, some of the example implementations described in this disclosure may increase the speed of the rendering pass because GPU 6 may not need to graphics process blocks of pixels that do not contribute to the final image.

After the rendering pass, display 8 may retrieve the pixel values stored in frame buffer 10 and present the final image on display 8. In some alternate examples, frame buffer 10 may not be necessary. In these alternate examples, GPU 6 may output the pixel values, from the rendering pass, directly to display 8 for presentment. For example, GPU 6 may perform similar functions as those described above with respect to FIG. 2D. However, in this example, rather than outputting pixel values to frame buffer 10, GPU 6 may output the pixel values directly to display 8 for presentation.

Figure 3:
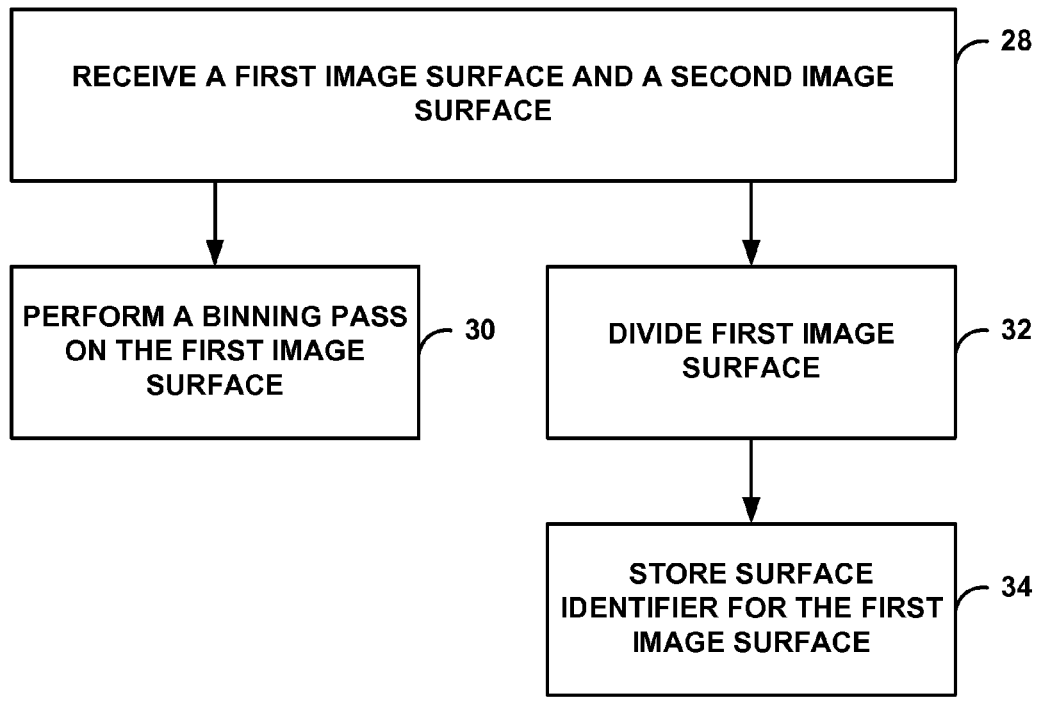
FIG. 3 is a flow chart illustrating an example operation of a graphics processing unit (GPU).

FIG. 3 is a flow chart illustrating an example operation of GPU 6. For purposes of illustration only, reference is made to FIGS. 1, and 2A-2E. GPU 6 may receive at least a first image surface and a second image surface (28). In some examples, the second image surface may at least partially overlap the first image surface. For example, the first image surface may be image surface 22, and the second image surface may be image surface 26. As described above, image surface 22 may be the back-most image surface, and image surface 26 may at least partially overlap image surface 22, as illustrated in FIG. 2E.

GPU 6 may then perform a binning pass on the first image surface (30). In the binning pass, GPU 6 may determine to which tiles the first image surface belongs. Based on the determination, GPU 6 may store in storage locations of a layer of tile memory 20 that correspond to the first image surface the surface identifier value of the first image surface. For example, as described above with respect to FIG. 2A, layer 24 of tile memory 20 corresponds to image surface 22. Also, as described above with respect to FIG. 2A, storage locations (0, 0), (0, 1), (1, 0), and (1, 1) of layer 24 each store the surface value identifier for image surface 22, e.g., the value of 0. In this example, storage locations (0, 0), (0, 1), (1, 0), and (1, 1) of layer 24 correspond to the tiles to which image surface 22 belongs.

During the binning pass of the first image surface, GPU 6 may divide the first image surface into a plurality of blocks of surface pixels of the first image surface (32). For example, as described above with respect to FIG. 2B, GPU 6 may divide image surface 22 into blocks 23A-23P. In this example, blocks 23A-23P may include 4×4 pixels of image surface 22.

Also, during the binning pass of the first image surface, GPU 6 may store the surface identifier value of the first image surface within a storage location of low resolution buffer 18 that corresponds to a block of the plurality of blocks of surface pixels of the first image surface (34). For example, as described above with respect to FIG. 2B, each of blocks 23 of image surface 22 may correspond to one storage location of low resolution buffer 18. As one example, location (0, 0) of low resolution buffer 18 may correspond to block 23A of image surface 22, location (1, 0) of low resolution buffer 18 may correspond to block 23B of image surface 22, and so forth. Also, block 23A may include surface pixels of image surface 22 that encompass (0, 0) to (3, 3) on display 8, and block 23B may include surface pixels of image surface 22 that encompass (3, 0) to (7, 3) on display 8, and so forth.

In one or more examples, the functions described may be implemented in hardware, software, firmware, or any combination thereof. If implemented in software, the functions may be stored as one or more instructions or code on an article of manufacture comprising a non-transitory computer-readable medium. Computer-readable media may include computer data storage media. Data storage media may be any available media that can be accessed by one or more computers or one or more processors to retrieve instructions, code and/or data structures for implementation of the techniques described in this disclosure. By way of example, and not limitation, such computer-readable media can comprise RAM, ROM, EEPROM, CD-ROM or other optical disk storage, magnetic disk storage, or other magnetic storage devices, flash memory, or any other medium that can be used to carry or store desired program code in the form of instructions or data structures and that can be accessed by a computer. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

The code may be executed by one or more processors, such as one or more DSPs, general purpose microprocessors, ASICs, FPGAs, or other equivalent integrated or discrete logic circuitry. In addition, in some aspects, the functionality described herein may be provided within dedicated hardware and/or software modules. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples have been described. These and other examples are within the scope of the following claims.

The invention claimed is:

1. A method comprising:
receiving, with a graphics processing unit (GPU), a plurality of image surfaces, wherein the plurality of image surfaces includes a first image surface and a second image surface, wherein the second image surface at least partially overlaps the first image surface;
assigning, with at least one of a processor and the GPU, a surface identifier value to each of the plurality of image surfaces starting with a back-most image surface of the plurality of image surfaces, and continuing to a front-most image surface of the plurality of image surfaces;
dividing a display into a plurality of tiles;
performing, with the GPU, a binning pass on the first image surface, wherein performing the binning pass comprises:
determining to which tiles the first image surface belongs; and
storing, in storage locations of a layer of a tile memory that correspond to the first image surface, a surface identifier value for the first image surface, assigned by at least one of the processor and the GPU, based on the determination of the tiles to which the first image belongs; and
during the binning pass of the first image surface, and prior to performing a binning pass on the second image surface:
dividing, with the GPU, the first image surface into a plurality of blocks of surface pixels of the first image surface; and
storing, with the GPU, the same surface identifier value for the first image surface within all storage locations, of a plurality of storage locations within a low resolution buffer, that each correspond to a block of the plurality of blocks of surface pixels of the first image surface, wherein each of the plurality of storage locations within the low resolution buffer also corresponds to a block of pixels the display.

2. The method of claim 1, further comprising:
performing the binning pass on the second image surface; and
during the binning pass of the second image surface:
dividing the second image surface into a plurality of blocks of surface pixels of the second image surface; and
storing a surface identifier value for the second image surface within a storage location of the plurality of storage locations within the low resolution buffer that corresponds to a block of the plurality of blocks of surface pixels of the second image surface when the block of the plurality of blocks of surface pixels of the second image surface is fully co-located with the block of pixels of the first image surface.

3. The method of claim 1, further comprising:
performing the binning pass on the second image surface; and
during the binning pass of the second image surface:
dividing the second image surface into a plurality of blocks of surface pixels of the second image surface; and
storing a surface identifier value for the second image surface within a storage location of the plurality of storage locations within the low resolution buffer that corresponds to a block of the plurality of blocks of surface pixels of the second image surface when the block of the plurality of blocks of surface pixels of the second image surface is not co-located with any of the plurality of blocks of pixels of the first image surface.

4. The method of claim 1, further comprising:
performing the binning pass on the second image surface; and
during the binning pass of the second image surface:
dividing the second image surface into a plurality of blocks of surface pixels of the second image surface; and
not storing a surface identifier value for the second image surface within a storage location of the plurality of storage locations within the low resolution buffer that corresponds to a block of the plurality of blocks of surface pixels of the second image surface when the block of the plurality of blocks of surface pixels of the second image surface is partially co-located with the block of pixels of the first image surface.

5. The method of claim 1, wherein each of the plurality of blocks of surface pixels of the first image surface includes two or more surface pixels of the first image surface, and wherein the block of pixels on the display includes two or more pixels on the display.

6. The method of claim 1, wherein receiving the plurality of image surfaces comprises receiving the plurality of image surfaces from a processor.

7. The method of claim 1, further comprising:
determining which portions of the first image surface are overlapped by the second image surface based on the surface identifier values stored in the low resolution buffer;
rendering the portions of the first image surface that are not overlapped by the second image surface based on the determination; and
eliminating from rendering the portions of the first image surface that are overlapped by the second image surface based on the determination.

8. An apparatus comprising:
a low resolution buffer that includes a plurality of storage locations;
a tile memory that includes a layer; and
a graphics processing unit (GPU) configured to:
receive a plurality of image surfaces, wherein the plurality of image surfaces includes a first image surface and a second image surface, wherein the second image surface at least partially overlaps the first image surface, and wherein at least one of a processor and the GPU is configured to assign a surface identifier value to each of the plurality of image surfaces starting with a back-most image surface of the plurality of image surfaces, and continuing to a front-most image surface of the plurality of image surfaces;
divide a display into a plurality of tiles;

perform a binning pass on the first image surface, wherein to perform the binning pass on the first image surface, the GPU is configured to:
  determine to which tiles the first image surface belongs; and
  store, in storage locations of the layer of the tile memory that correspond to the first image surface, a surface identifier value for the first image surface, assigned by at least one of the processor and the GPU, based on the determination of the tiles to which the first image belongs; and
during the binning pass of the first image surface, and prior to the GPU performing a binning pass on the second image surface, the GPU is further configured to:
  divide the first image surface into a plurality of blocks of surface pixels of the first image surface; and
  store the same surface identifier value for the first image surface within all storage locations, of a plurality of storage locations within a low resolution buffer, that each correspond to a block of the plurality of blocks of surface pixels of the first image surface, wherein each of the plurality of storage locations within the low resolution buffer also corresponds to a block of pixels on the display.

9. The apparatus of claim 8, wherein the GPU is further configured to:
perform the binning pass on the second image surface; and
during the binning pass of the second image surface:
  divide the second image surface into a plurality of blocks of surface pixels of the second image surface; and
  store a surface identifier value for the second image surface within a storage location of the plurality of storage locations within the low resolution buffer that corresponds to a block of the plurality of blocks of surface pixels of the second image surface when the block of the plurality of blocks of surface pixels of the second image surface is fully co-located with the block of pixels of the first image surface.

10. The apparatus of claim 8, wherein the GPU is further configured to:
perform the binning pass on the second image surface; and
during the binning pass of the second image surface:
  divide the second image surface into a plurality of blocks of surface pixels of the second image surface; and
  store a surface identifier value for the second image surface within a storage location of the plurality of storage locations within the low resolution buffer that corresponds to a block of the plurality of blocks of surface pixels of the second image surface when the block of the plurality of blocks of surface pixels of the second image surface is not co-located with any of the plurality of blocks of pixels of the first image surface.

11. The apparatus of claim 8, wherein the GPU is further configured to:
perform the binning pass on the second image surface; and
during the binning pass of the second image surface:
  divide the second image surface into a plurality of blocks of surface pixels of the second image surface; and
  not store a surface identifier value for the second image surface within a storage location of the plurality of storage locations within the low resolution buffer that corresponds to a block of the plurality of blocks of surface pixels of the second image surface when the block of the plurality of blocks of surface pixels of the second image surface is partially co-located with the block of pixels of the first image surface.

12. The apparatus of claim 8, wherein each of the plurality of blocks of surface pixels of the first image surface includes two or more surface pixels of the first image surface, and wherein the block of pixels on the display includes two or more pixels on the display.

13. The apparatus of claim 8, further comprising the processor, wherein the GPU receives the plurality of image surfaces from the processor.

14. The apparatus of claim 8, wherein the GPU is further configured to:
  determine which portions of the first image surface are overlapped by the second image surface based on the surface identifier values stored in the low resolution buffer;
  render the portions of the first image surface that are not overlapped by the second image surface based on the determination; and
  eliminate from rendering the portions of the first image surface that are overlapped by the second image surface based on the determination.

15. The apparatus of claim 8, wherein the apparatus comprises at least one of a wireless device, a mobile telephone, a personal digital assistant (PDA), a video gaming console that includes a video display, a mobile video conferencing unit, a laptop computer, a desktop computer, a television set-top box, a tablet computing device, and an e-book reader.

16. A non-transitory computer-readable storage medium comprising instructions that cause a graphics processing unit (GPU) to:
  receive a plurality of image surfaces, wherein the plurality of image surfaces includes a first image surface and a second image surface, wherein the second image surface at least partially overlaps the first image surface;
  assign a surface identifier value to each of the plurality of image surfaces starting with a back-most image surface of the plurality of image surfaces, and continuing to a front-most image surface of the plurality of image surfaces;
  divide a display into a plurality of tiles;
  perform a binning pass on the first image surface, wherein the instructions that cause the GPU to perform the binning pass comprise instructions that cause the GPU to:
    determine to which tiles the first image surface belongs; and
    store, in storage locations of a layer of a tile memory that corresponds to the first image surface, a surface identifier value for the first image surface, assigned by the GPU, based on the determination of the tiles to which the first image belongs; and
  during the binning pass of the first image surface, and prior to performing a binning pass on the second image surface:
    divide the first image surface into a plurality of blocks of surface pixels of the first image surface; and
    store the same surface identifier value for the first image surface within all storage locations, of a plurality of storage locations within a low resolution buffer, that each correspond to a block of the plurality of blocks of surface pixels of the first image surface, wherein each of the plurality of storage locations within the low resolution buffer also corresponds to a block of pixels on the display.

17. The non-transitory computer-readable storage medium of claim 16, further comprising instructions to:
perform the binning pass on the second image surface; and
during the binning pass of the second image surface:

divide the second image surface into a plurality of blocks of surface pixels of the second image surface; and store a surface identifier value for the second image surface within a storage location of the plurality of storage locations within the low resolution buffer that corresponds to a block of the plurality of blocks of surface pixels of the second image surface when the block of the plurality of blocks of surface pixels of the second image surface is fully co-located with the block of pixels of the first image surface.

18. The non-transitory computer-readable storage medium of claim 16, further comprising instructions to:

perform the binning pass on the second image surface; and during the binning pass of the second image surface:

divide the second image surface into a plurality of blocks of surface pixels of the second image surface; and store a surface identifier value for the second image surface within a storage location of the plurality of storage locations within the low resolution buffer that corresponds to a block of the plurality of blocks of surface pixels of the second image surface when the block of the plurality of blocks of surface pixels of the second image surface is not co-located with any of the plurality of blocks of pixels of the first image surface.

19. The non-transitory computer-readable storage medium of claim 16, further comprising instructions to:

perform the binning pass on the second image surface; and during the binning pass of the second image surface:

divide the second image surface into a plurality of blocks of surface pixels of the second image surface; and not store a surface identifier value for the second image surface within a storage location of the plurality of storage locations within the low resolution buffer that corresponds to a block of the plurality of blocks of surface pixels of the second image surface when the block of the plurality of blocks of surface pixels of the second image surface is partially co-located with the block of pixels of the first image surface.

20. The non-transitory computer-readable storage medium of claim 16, wherein each of the plurality of blocks of surface pixels of the first image surface includes two or more surface pixels of the first image surface, and wherein the block of pixels on the display includes two or more pixels on the display.

21. The non-transitory computer-readable storage medium of claim 16, wherein the instructions to receive the plurality of image surfaces comprise instructions to receive the plurality of image surfaces from a processor.

22. The non-transitory computer-readable storage medium of claim 16, further comprising instructions to:

determine which portions of the first image surface are overlapped by the second image surface based on the surface identifier values stored in the low resolution buffer;

render the portions of the first image surface that are not overlapped by the second image surface based on the determination; and eliminate from rendering the portions of the first image surface that are overlapped by the second image surface based on the determination.

23. An apparatus comprising:

a low resolution buffer that includes a plurality of storage locations; and a graphics processing unit (GPU), wherein the GPU comprises:

means for receiving a plurality of image surfaces, wherein the plurality of image surfaces includes a first image surface and a second image surface, wherein the second image surface at least partially overlaps the first image surface;

means for assigning a surface identifier value to each of the plurality of image surfaces starting with a back-most image surface of the plurality of image surfaces, and continuing to a front-most image surface of the plurality of image surfaces;

means for dividing a display into a plurality of tiles;

means for performing a binning pass on the first image surface, wherein the means for performing the binning pass comprises:

means for determining to which tiles the first image surface belongs; and means for storing, in storage locations of a layer of a tile memory that corresponds to the first image surface, a surface identifier value for the first image surface, assigned by the GPU, based on the determination of the tiles to which the first image belongs; and means for, during the binning pass of the first image surface, and prior to performing a binning pass on the second image surface:

dividing the first image surface into a plurality of blocks of surface pixels of the first image surface; and storing the same surface identifier value for the first image surface within all storage locations, of a plurality of storage locations within a low resolution buffer, that each correspond to a block of the plurality of blocks of surface pixels of the first image surface, wherein each of the plurality of storage locations within the low resolution buffer also corresponds to a block of pixels on the display.

24. The apparatus of claim 23, wherein the GPU further comprises:

means for performing the binning pass on the second image surface; and means for, during the binning pass of the second image surface:

dividing the second image surface into a plurality of blocks of surface pixels of the second image surface; and storing a surface identifier value for the second image surface within a storage location of the plurality of storage locations within the low resolution buffer that corresponds to a block of the plurality of blocks of surface pixels of the second image surface when the block of the plurality of blocks of surface pixels of the second image surface is fully co-located with the block of pixels of the first image surface.

25. The apparatus of claim 23, wherein the GPU further comprises:

means for performing the binning pass on the second image surface; and means for, during the binning pass of the second image surface:

dividing the second image surface into a plurality of blocks of surface pixels of the second image surface; and storing a surface identifier value for the second image surface within a storage location of the plurality of storage locations within the low resolution buffer that corresponds to a block of the plurality of blocks of surface pixels of the second image surface when the block of the plurality of blocks of surface pixels of the second image surface is not co-located with any of the plurality of blocks of pixels of the first image surface.

26. The apparatus of claim 23, wherein the GPU further comprises:
   means for performing the binning pass on the second image surface; and
   means for, during the binning pass of the second image surface:
      dividing the second image surface into a plurality of blocks of surface pixels of the second image surface; and
      not storing a surface identifier value for the second image surface within a storage location of the plurality of storage locations within the low resolution buffer that corresponds to a block of the plurality of blocks of surface pixels of the second image surface when the block of the plurality of blocks of surface pixels of the second image surface is partially co-located with the block of pixels of the first image surface.

27. The apparatus of claim 23, wherein each of the plurality of blocks of surface pixels of the first image surface includes two or more surface pixels of the first image surface, and wherein the block of pixels on the display includes two or more pixels on the display.

28. The apparatus of claim 23, wherein the means for receiving the plurality of image surfaces comprises means for receiving the plurality of image surfaces from a processor.

29. The apparatus of claim 23, wherein the GPU further comprises:
   means for determining which portions of the first image surface are overlapped by the second image surface based on the surface identifier values stored in the low resolution buffer;
   means for rendering the portions of the first image surface that are not overlapped by the second image surface based on the determination; and
   means for eliminating from rendering the portions of the first image surface that are overlapped by the second image surface based on the determination.

30. The apparatus of claim 23, wherein the apparatus comprises at least one of a wireless device, a mobile telephone, a personal digital assistant (PDA), a video gaming console that includes a video display, a mobile video conferencing unit, a laptop computer, a desktop computer, a television set-top box, a tablet computing device, and an e-book reader.

* * * * *